United States Patent [19]
Ohta

[11] Patent Number: 4,515,248
[45] Date of Patent: May 7, 1985

[54] BUFFER DEVICE FOR ELEVATOR

[75] Inventor: Kazutoshi Ohta, Nagoya, Japan

[73] Assignee: Mitsubishi Denki Kabushiki Kaisha, Tokyo, Japan

[21] Appl. No.: 431,085

[22] Filed: Sep. 30, 1982

[30] Foreign Application Priority Data

Oct. 8, 1981 [JP] Japan .............................. 56-160770

[51] Int. Cl.³ .............................................. B66B 5/28
[52] U.S. Cl. .................... 187/67; 187/1 R; 188/377; 206/586; 220/445; 220/902
[58] Field of Search ................. 104/254, 256; 187/67; 188/371, 372, 377; 206/523, 586; 220/902, 445; 293/1; 109/45, 53, 56, 78, 84

[56] References Cited

U.S. PATENT DOCUMENTS

| | | | |
|---|---|---|---|
| 773,269 | 10/1904 | Vanderman | 109/84 X |
| 1,594,317 | 7/1926 | Moore | 187/67 |
| 3,721,433 | 3/1973 | Sobel | 293/1 X |
| 3,888,502 | 6/1975 | Felzer et al. | 188/371 X |
| 4,407,373 | 10/1983 | Willis et al. | 187/67 X |

FOREIGN PATENT DOCUMENTS 2400176 7/1975 Fed. Rep. of Germany ...... 188/377

OTHER PUBLICATIONS

"Electrical Lifts", R. S. Phillips, Sir Isaac Pitman & Sons, Ltd., London, 1939, pp. 180–184, and FIG. 162.

Primary Examiner—Joseph J. Rolla
Assistant Examiner—Lawrence J. Miller
Attorney, Agent, or Firm—Wenderoth, Lind & Ponack

[57] ABSTRACT

A buffer device for an elevator employs, as a buffer member, a foamed plastic material such as polyurethane foam which undergoes very little permanent deformation upon receipt of an impact. The foamed plastic material is accommodated in a box made of a thin noncombustible material, and a heat-insulating material is disposed between the box and the buffer member in the box.

12 Claims, 5 Drawing Figures

BUFFER DEVICE FOR ELEVATOR

BACKGROUND OF THE INVENTION

The present invention relates to an improved buffer device for an elevator.

First, a conventional buffer system is described below in conjunction with FIG. 1, in which reference numeral 1 denotes a cage room, reference numeral 2 denotes a vibration-absorbing rubber element which supports the cage room 1, and reference numeral 3 denotes a cage frame having horizontal beams forming the cage floor which are flush with the right and left poles of the cage frame 3. A buffer receiver 4 is provided to come into contact with the buffer for the cage frame 3. In the case of FIG. 1, the buffer 5 consists of a spring which is installed on the upper surface of a pit floor 6 in the hoist path.

In case the elevator continues to descend by some cause, the cage room 1 and the cage frame 3 together come into collision with the buffer 5 at a given speed. FIG. 2 illustrates the dynamic model of this case; i.e., the force is concentrated at both ends A, B relative to the center C of the beam. That is, the horizontal beam must be reinforced to provide strength so that the horizontal beam will not be deflected.

A plurality of buffers 5 consisting of springs may be installed. In this case, however, the elevator system becomes expensive.

SUMMARY OF THE INVENTION

An object of present invention is to eliminate the defects inherent in the above-mentioned conventional art. According to the invention, a buffer device is provided for an elevator, which distributes the load exerted at the time of collision over wide pressure-receiving areas instead of being concentrated, in order to obtain an excellent buffer effect, and according to which the weight of the cage is reduced as far as possible to reduce the manufacturing cost.

DESCRIPTION OF THE PREFERRED EMBODIMENTS

Figure 1:
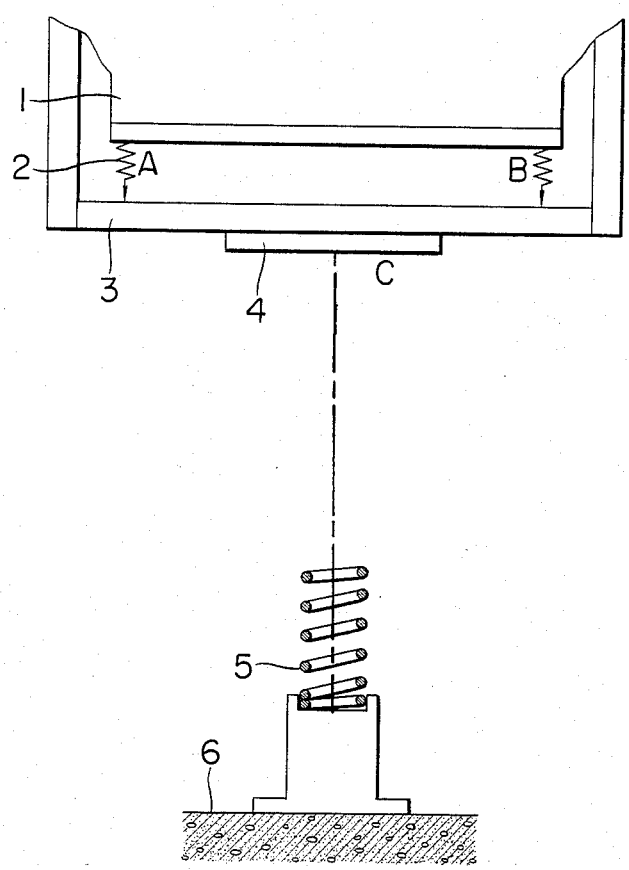
FIG. 1 is a diagram illustrating a conventional buffer for elevator.
Figure 2:
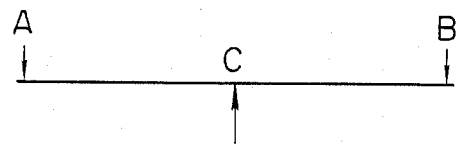
FIG. 2 is a diagram of dynamic model which illustrates forces that act on the cage when the conventional buffer for an elevator works.
Figure 3:
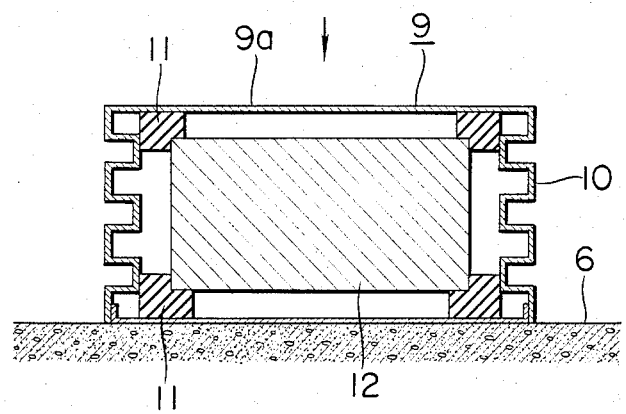
FIG. 3 is a section view illustrating a buffer for an elevator according to an embodiment of the present invention.
Figure 4:
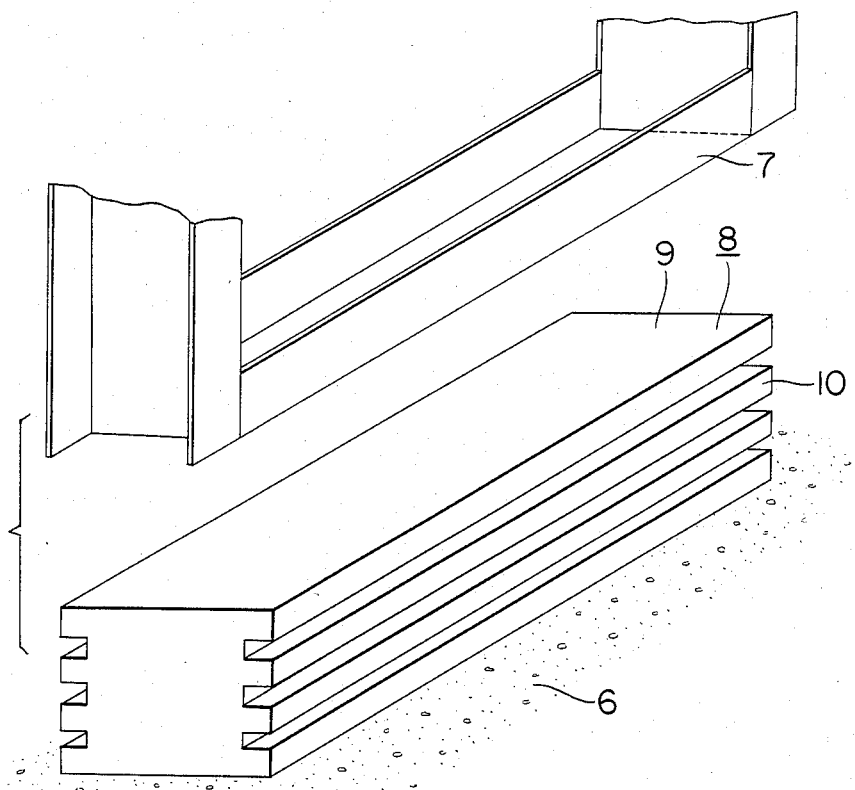
FIG. 4 is a perspective view of a buffer for an elevator according to the present invention.

The buffer for an elevator according to preferred embodiments of the present invention will be described below in conjunction with the accompanying drawings. FIG. 3 is a section view illustrating the setup according to one embodiment, and FIG. 4 is a perspective view thereof. In FIGS. 3 and 4, the same portions as those of FIG. 1 are denoted by the same reference numerals. Reference numeral 7 denotes a buffer receiver, reference numeral 8 denotes a buffer, reference numeral 9 denotes a box made of thin steel plates, reference numeral 10 denotes side surfaces, reference numeral 11 denotes a heat-insulating material, and reference numeral 12 denotes a foamed plastic material composed of polyurethane foam which is compressible and develops very little permanent deformation as the result of one impact.

As will be obvious from the drawings, the side surfaces 10 of the buffer 8 have recessed portions and protruded portions which alternate in the form of comb teeth. The buffer 8 is accommodated in the box 9 of thin steel plates. The foamed plastic material 12, which produces a buffer effect, is accommodated in the center of the buffer 8. The heat-insulating materials 11 are accommodated between the foamed plastic material 12 and the box 9 made of thin steel plates, at the top and bottom edges thereof. Insulating bricks and foamed plastic material are used as heat-insulating materials.

FIG. 4 illustrates the state of the device just before the buffer works. The buffer function develops from a moment at which the buffer receiver comes into contact with the box 9 made of thin steel plates. In this case, side surfaces of the box 9 made of thin steel plates are bent, the load is distributed over the upper surface 9a, and the load is exerted on the foamed plastic material 12 which produces the buffer effect.

Figure 5:
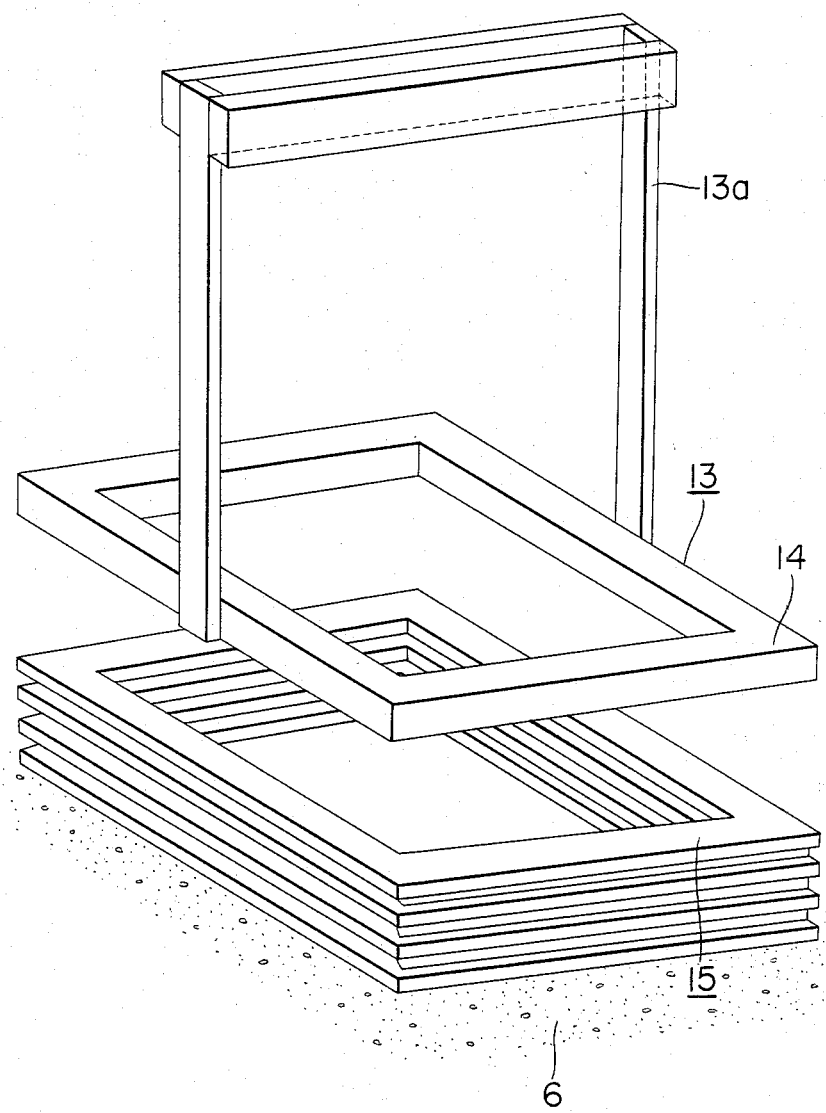
FIG. 5 is a perspective view of a buffer for an elevator according to another embodiment of the present invention.

FIG. 5 illustrates the buffer for elevators according to another embodiment of the present invention, in which reference numeral 13a denotes poles of the cage frame 13, and reference numeral 14 denotes the buffer receiver that is opposed to an open rectangular (square) cage floor of the cage frame.

According to this embodiment, the buffer 15 which receives the pressure over its surface has an open rectangular (square) shape, so that the impact is distributed over the surface. Therefore, the cage frame 13 requires no reinforcement, and makes it possible to reduce the weight. Even in the case of FIG. 5, the heat-insulating material 11 is accommodated in the buffer 15 as a matter of course.

Equipment in the hoist path was not ever destroyed entirely in past calamities of fire in buildings. Ends of the wiring were simply melted in the past. According to the present invention, however, there arises no problem since the foamed plastic material 12 is thermally isolated by the heat-insulating material 11 and space created thereby.

According to the present invention as illustrated in the foregoing, the buffer for an elevator is made up of a foamed plastic material such as polyurethane foam which will be permanently deformed in negligibly small amounts upon the impact of one time or so, a non-combustible box made of a thin metal plate which is, for example, 0.4 mm thick, covers the foamed plastic material, and a heat-insulating material is disposed between the foamed plastic material and the box. Therefore, the impact can be received so as to be distributed over the surface, and the weight of the cage can be reduced.

Even, in case of fire, the buffer member is damaged little owing to the heat-insulating material and space created thereby. Therefore, the buffer effect can be maintained even during the early stage of a fire.

Further, in case the pit floor of the hoist path is submerged in water, the elevator is not permitted to operate due to the function of other devices. The buffer effect, however, can be maintained if the non-combustible box is hermetically sealed against water, or if the buffer member is wrapped in a vinyl bag.

What is claimed is:

1. An elevator comprising:
   a cage frame having a floor, spaced vertical support posts, and a buffer receiver opposed to said floor; and
   a buffer having an upper surface below and aligned with a lower surface of said buffer receiver so as to mate therewith and uniformly receive the weight of said cage frame when said cage frame falls vertically downwardly thereon;
   said buffer including
   a box formed of thin non-combustible material having said upper surface,
   a compressible box-shaped buffer member formed of foamed plastic material accommodated in said box, spaced from the peripheral walls thereof, and
   heat-insulating material disposed between said peripheral walls of said box and said foamed plastic material.

2. An elevator as in claim 1, wherein said peripheral walls include alternating recessed and protruding portions.

3. An elevator according to claim 1, wherein said box is formed of a non-combustible material which is 0.4 mm thick.

4. An elevator according to claim 1, wherein said box has a water-tight construction.

5. An elevator as in claim 1, wherein said heat-insulating material is located at the top and bottom edges of said buffer member so as to support said buffer member in spaced relation to the peripheral walls of said box with open spaces at locations between said buffer member and said peripheral walls other than said top and bottom edges.

6. An elevator as in claim 5, wherein said peripheral walls include alternating recessed and protruding portions.

7. An elevator comprising:
   a cage frame having spaced vertical support posts and a cage floor;
   an open rectangular base buffer receiver at the periphery of said cage frame opposed to said cage floor; and
   a buffer having an open rectangular upper surface below and aligned with a lower surface of said buffer receiver so as to mate therewith and uniformly receive the weight of said cage frame when said cage frame falls vertically downwardly thereon;
   said buffer including
   an open rectangular box formed of thin non-combustible material having said open rectangular upper surface,
   a compressible open rectangular box-shaped buffer member formed of foamed plastic material accomodated in said box, spaced from the peripheral walls thereof, and
   heat-insulating material disposed between said peripheral walls of said box and said foamed plastic material.

8. An elevator as in claim 7, wherein said peripheral walls include alternating recessed and protruding portions.

9. An elevator according to claim 7, wherein said open rectangular box is formed of a non-combustible material which is 0.4 mm thick.

10. An elevator according to claim 7, wherein said open rectangular box has a water-tight construction.

11. An elevator as in claim 7, wherein said heat-insulating material is located at the top and bottom edges of said buffer member so as to support said buffer member in spaced relation to the peripheral walls of said open rectangular box with open spaces at locations between said buffer member and said peripheral walls other than said top and bottom edges.

12. An elevator as in claim 11, wherein said peripheral walls include alternating recessed and protruding portions.

* * * * *